United States Patent
Aarhus et al.

(10) Patent No.: US 8,206,111 B2
(45) Date of Patent: Jun. 26, 2012

(54) ADJUSTABLE, SELF-ALIGNING ROTOR LOCKING DEVICE FOR AN AEROGENERATOR

(75) Inventors: Karl Aarhus, Silkeborg (DK); Javier Cerrada Garate, Pamplona (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 698 days.

(21) Appl. No.: 12/513,804

(22) PCT Filed: Nov. 13, 2007

(86) PCT No.: PCT/ES2007/000647
§ 371 (c)(1),
(2), (4) Date: May 6, 2009

(87) PCT Pub. No.: WO2008/059088
PCT Pub. Date: May 22, 2008

(65) Prior Publication Data
US 2010/0021299 A1    Jan. 28, 2010

(30) Foreign Application Priority Data
Nov. 13, 2006    (ES) .................................. 200602874

(51) Int. Cl.
*F03D 9/00*    (2006.01)
(52) U.S. Cl. .................... 416/169 R; 415/123; 416/153; 416/159

(58) Field of Classification Search ................... 415/123; 416/46, 106, 107, 153, 159, 169 R, 245 R, 416/245 A
See application file for complete search history.

(56) References Cited

U.S. PATENT DOCUMENTS
2,656,971 A * 10/1953 Mader ........................... 415/123

FOREIGN PATENT DOCUMENTS
| DE | 10031472 C1 | 4/2002 |
| EP | 1291521 A1 | 3/2003 |
| WO | 2005/090780 A1 | 9/2005 |

* cited by examiner

*Primary Examiner* — Dwayne J White
(74) *Attorney, Agent, or Firm* — Ladas & Parry LLP

(57) ABSTRACT

Wind turbine having a rotor, a nacelle frame (13) housing with electrical generation means coupled to the rotor hub (11), braking means and control means of the drive train rotational position, the nacelle frame (13) and the rotor hub (11) having an arrangement for preventing the rotor hub (11) rotation when certain maintenance or assembly activities should be carried out, the arrangement including at least one sliding pin (21) in the nacelle (13), first actuating means (31) for pushing/pulling it axially into/from at least one corresponding hole (23) in the rotor hub (11) and means for allowing vertical and lateral adjustment displacements of the sliding pin (21) so that it can remain concentrically aligned with the hole (23) when it is inserted into it.

10 Claims, 2 Drawing Sheets

ADJUSTABLE, SELF-ALIGNING ROTOR LOCKING DEVICE FOR AN AEROGENERATOR

FIELD OF THE INVENTION

The invention relates to a self-aligning and adjustable rotor lock device to be temporarily used on wind turbines.

BACKGROUND

Rotor locks systems are needed on wind turbines in order to assure that the rotor is not rotating when service activities takes place. The lock is usually part of the redundant system which also includes the brake.

Typically the rotor lock system comprises one or more pins (often two pins) which are pushed into holes in the hub, the main shaft or a loose flange. The pins are attached to the non moving part of the wind turbine and thereby preventing a rotation of the drive train.

As wind turbines are becoming bigger the dimensions are also increased. This increase in dimensions leads to increased absolute tolerances in the relative position of the pins and the locking holes. Additionally the structural deflections due to the large weight of the drive train may lead to further problems in the alignment of the pins and holes.

These problems in aligning the pins and the holes leads to an uneven load sharing between the pins due to the torque. A consequence of this is that the main bearings of the drive train will be subjected to loads originating from the torque. In the extreme case only one of the pins may react to the torque load and thus the main shaft will become loaded with a force equivalent of the pin reaction force. The force on the shaft is counteracted by the main bearing(s) and hence the bearings may be subjected to relative high loads in a standstill configuration.

The loading of bearings in a standstill configuration is usually undesirable due to the risk of false brinelling and the risk of metal to metal contacts when the lubricant has been pushed out of the contact zone.

EP 1 291 521 A1 discloses a rotor lock system using pins with tapered ends and holes with tapered apertures allowing for compensation of misalignment between the pins and the holes and the elimination or at least reduction of the play between the pins and the holes.

However this system does not solve all alignment problems involved in big turbines. This invention is intended to solve this drawback.

SUMMARY OF THE INVENTION

It is an object of the present invention to provide a self-aligning and adjustable rotor lock arrangement for a wind turbine, which ensures an accurate alignment of the pins attached to the non moving part of the wind turbine with respect to the mating holes located in a rotating part of the wind turbine.

Another object of the present invention is to provide a wind turbine with an adjustable rotor lock arrangement which reduces the load on the main bearings of the drive train.

These and other objects of the present invention are met by providing a wind turbine comprising a rotor, a nacelle frame housing, electrical generation means coupled to the rotor hub, braking means and control means of the drive train position, with an arrangement for preventing the rotor hub rotation when maintenance or assembly activities should be carried out, including at least one sliding pin in the nacelle frame and first actuating means for pushing/pulling them axially into/from at least one corresponding hole in the rotor hub and means for allowing vertical (tangential) and lateral (radial) adjustment displacements of said sliding pin so that it can remain concentrically aligned with said hole when it is inserted into it.

One advantage of this invention is that said displacements can take place in two directions, i.e. within a plane.

Other features and advantages of the present invention will be understood from the following detailed description of an illustrative and by no means limiting embodiment of its object in relation with the enclosed drawings.

DETAILED DESCRIPTION OF PREFERRED EMBODIMENTS

Figure 1A:
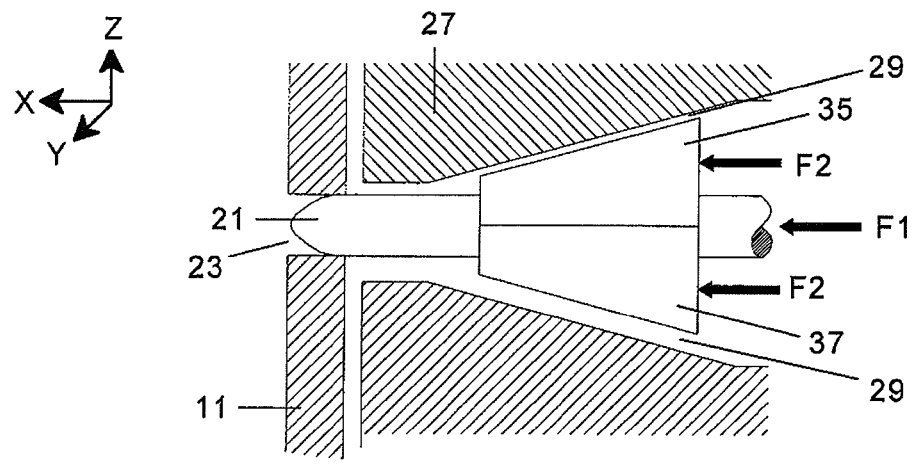
FIGS. 1a, 1b and 1c show schematically the self-alignment adjusting functionality of the arrangement for preventing the rotor hub rotation according to the present invention.

A typical wind turbine comprises a tower supporting a nacelle structure which contains means for converting the rotational energy of the turbine blades into electrical energy.

The structural components of the drive train of a wind turbine to which the rotor lock device according to this invention is applicable are typically a rotor hub, to which one or more blades are attached, a main shaft, a main shaft bearing arrangement, a gearbox and a generator. The primary purpose of these structural components are to transfer the driving torque generated by the rotor to the generator and increase the shaft speed in order to achieve a suitable rotational speed for the generator rotor.

As in known rotor locking systems, the basic components of the rotor lock arrangement according to the present invention are sliding pins 21 mounted to the nacelle frame 13 and mating holes 23 located in the rotor hub 11.

In this invention, the nacelle frame 13 and the rotor hub 11 shall be understood in a broad sense, as suitable supporting locations for said sliding pins 21 and mating holes 23 in, respectively, a non-rotating part and a rotating part of the wind turbine.

In a preferred embodiment of this invention illustrated in the Figures the housing 25 of a sliding pin 21 has a progressively reduced inner section in its outer end zone 27 and the rotor lock arrangement includes two symmetrical wedges 35, 37 with respect to a central horizontal plane, that embrace the sliding pin 21, that have a progressively reduced section and that are designed for being able to be moved axially along said outer end zone 27 of the housing 25 from an initial position in which there is a gap 29 between the wedges 35, 37 and the inner surface of the outer end zone 27 of the housing 25 until a final position in which they make contact with it.

Figure 1B:
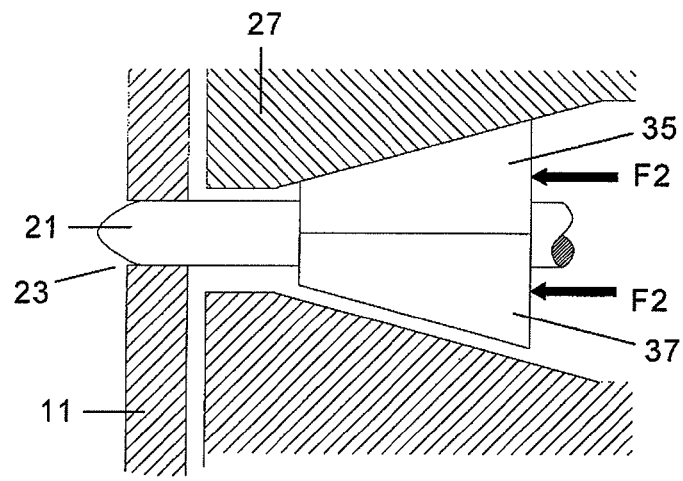
Figure 1C:
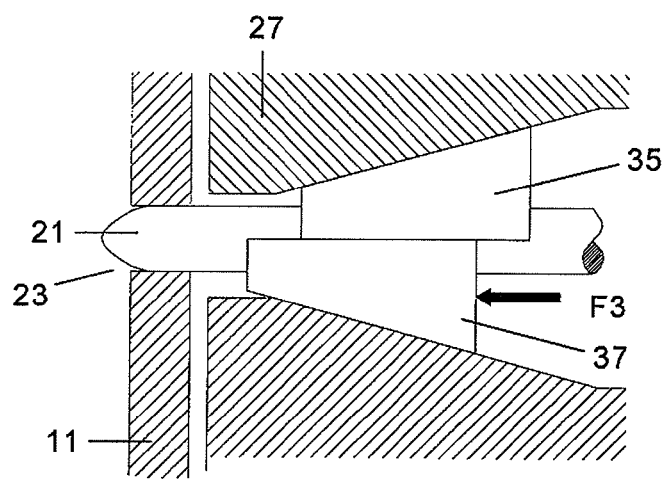

Following the sequence shown in FIGS. 1a, 1b and 1c it can be seen that initially (FIG. 1a) the sliding pin 21 pushed by a force F1 advances introducing itself in the hole 23 in the rotor hub 11 accompanied by wedges 35, 37 pushed by forces F2 until upper wedge 35 makes contact with the inclined face 27 of the housing 25 because the sliding pin 21 x-axis has been moved up from its nominal position in the centre of the housing 25 (FIG. 1b). Secondly, lower wedge 37 continue advancing pushed by force F3 until making contact with the housing end zone 27 (FIG. 1c). In this final position, the sliding pin 21 is kept aligned with the hole 23 between the two wedges 35, 37.

As can be easily understood, this arrangement provides a self-alignment mechanism between the sliding pin 21 and the hole 23 because the x-axis of the sliding pin 21 can be displaced vertically and laterally (i.e. following the y-axis and the z-axis) by wedges 35, 37 in order to be aligned with the hole 23 compensating offsets due to tolerances between the centre axis of housing 25 and hole 23.

In a preferred embodiment vertical (tangential) and lateral (radial) adjustment are achieved by having inclined planes in the sliding pin housing 25 and in the wedges 35, 37. Initially the wedges 35, 37 are free to move parallel to the inclined planes in vertical and lateral directions. The final position of the wedges 35, 37 with respect to the sliding pin housing 25 is thus controlled by the sliding pin 21 engagement in the hole 23.

The sliding pins 21 and the wedges 35, 37 are pushed by means of an hydraulic system which can also be used to pull the sliding pins 21 back.

Figure 2:
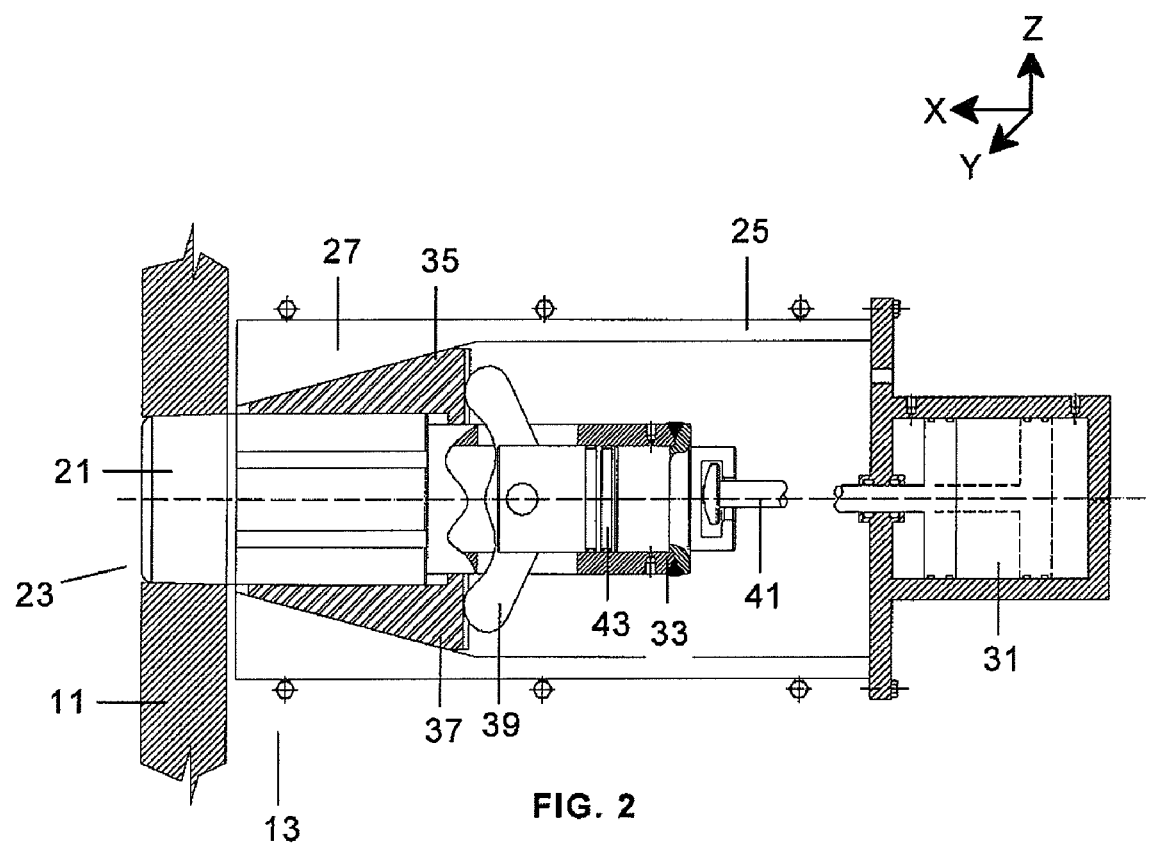
FIG. 2 shows a section view of the arrangement for preventing the rotor hub rotation according to the present invention.

Following FIG. 2 it can be seen that in a preferred embodiment the arrangement comprises a main hydraulic piston 41 within a first actuating means 31 providing forces F1 and F2 and an internal hydraulic piston 43 within a second actuating means 33 providing force F3 through lever arm 39 connected to wedges 35, 37.

Electric or pneumatic systems can also be used for actuating pistons 41, 43.

Figure 3:
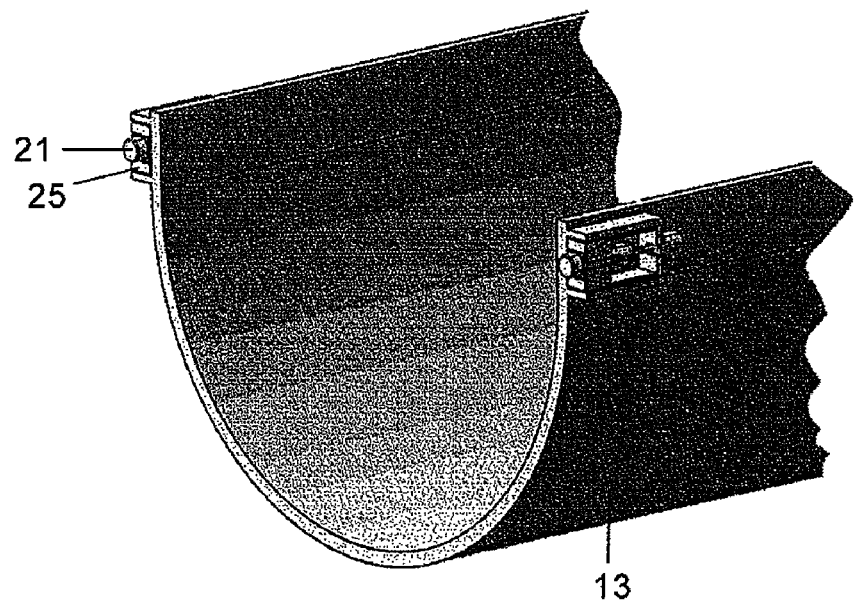
FIG. 3 shows a perspective view of the part of the arrangement for preventing the rotor hub rotation according to the present invention which is located in the wind turbine nacelle frame.

In the preferred embodiment illustrated in FIG. 3, the arrangement for preventing the rotor hub rotation according to the present invention comprise two sliding pins 21 in housings 25 located in diametrically opposed positions in the nacelle frame 13. The rotor hub 11 can have one pair of diametrically opposed mating holes 23 or several pairs of diametrically opposed mating holes 23 for facilitating a correct positioning of the rotor hub 11 with respect to the sliding pins 21 when it is stopped for the locking operation.

The operation of the rotor locking arrangement according to this invention can be performed either manually or automatically.

In the manual operation, and in similar manner to known systems, the stopping of the drive train in the required position and the activation of the rotor locking system are tasks carried out independently. The stopping of the drive train is usually made reducing firstly the rpm to a very low value and secondly activating the brake system. Once the rotor has stopped the rotor locking arrangement is activated for pushing the sliding pins into the holes. This procedure may need several attempts before the sliding pins and the holes are properly aligned. This leads to an increased down time for the turbine.

If the wind turbine have a drive train rotational position measurement means then an automatic operation of the rotor locking arrangement is feasible because the rotor can be brought to a stop in a position where the pins are aligned with the locking holes so that a subsequent automatic activation of the rotor locking arrangement can be done.

Although the present invention has been fully described in connection with preferred embodiments, it is evident that modifications may be introduced within the scope thereof, not considering this as limited by these embodiments, but by the contents of the following claims.

The invention claimed is:

1. Wind turbine comprising a rotor, a nacelle frame (13) housing with electrical generation means coupled to the rotor hub (11), braking means and control means of the drive train rotational position, the nacelle frame (13) and the rotor hub (11) having an arrangement for preventing the rotor hub (11) rotation when certain maintenance or assembly activities should be carried out, said arrangement including at least one sliding pin (21) in the nacelle (13) and first actuating means (31) for pushing/pulling it axially into/from at least one corresponding hole (23) in the rotor hub (11), characterized in that said arrangement also comprises means for allowing vertical and lateral adjustment displacements of said sliding pin (21) so that it can remain concentrically aligned with said hole (23) when it is inserted into it.

2. Wind turbine according to claim 1, characterized in that said means for allowing vertical and lateral displacements of said sliding pin (21) comprises:
   a) a sliding pin housing (25) in the nacelle frame (13) having a progressively reduced inner section in its outer end zone (27);
   b) upper and lower wedges (35, 37) embracing the sliding pin (21), having a progressively reduced section and being designed to be independently moved axially along said outer end zone (27) from an initial position in which there is a gap (29) between the wedges (35, 37) and the inner surface of said outer end zone (27) until a final position in which they make contact with it, said first actuating means (31) being arranged for pushing/pulling the sliding pin (21) and the upper and lower wedges (35, 37) at the same time; and
   c) second actuating means (33) and lever arm (39) for moving one of said wedges (35, 37) when the other wedge make contact with the housing (25).

3. Wind turbine according to claim 2, characterized in that said upper and lower wedges (35, 37) are symmetrical with respect to an hypothetical horizontal central plane in said outer end zone (27) of sliding pin housing (25).

4. Wind turbine according to claim 1, characterized in that the external shape of said upper and lower wedges (35, 37) and the internal shape of said outer end zone (27) of sliding pin housing (25) include inclined planes where said contacts between the wedges (35, 37) and the outer end zone (27) take place.

5. Wind turbine according to claim 1, characterized in that said first and second actuating means (31, 33) comprise hydraulically actuated pistons (41, 43).

6. Wind turbine according to claim 1, characterized in that said first and second actuating means (31, 33) comprise electrically actuated pistons (41, 43).

7. Wind turbine according to claim 1, characterized in that said first and second actuating means (31, 33) comprise pneumatically actuated pistons (41, 43).

8. Wind turbine according to claim 1, characterized in that said arrangement for preventing the rotor hub (11) rotation comprises two sliding pins (21) in the nacelle frame (13) and two corresponding holes (23) in the rotor hub (11) in diametrically opposed positions.

9. Wind turbine according to claim 1, characterized in that said arrangement for preventing the rotor hub (11) rotation comprises two sliding pins (21) in the nacelle frame (13) and several pairs of corresponding holes (23) in the rotor hub (11) in diametrically opposed positions.

10. Wind turbine according to claim 1, characterized in that said arrangement for preventing the rotor hub (11) rotation also comprises communication means with the drive train position control means for performing automatically the rotor lock setting when the rotor has been stopped in a position where the sliding pins (21) are aligned with the holes (23).

* * * * *